(12) United States Patent
Nallapa et al.

(10) Patent No.: US 9,718,404 B2
(45) Date of Patent: Aug. 1, 2017

(54) PARKING OBSTRUCTION LOCATOR AND HEIGHT ESTIMATOR

(71) Applicant: Ford Global Technologies, LLC, Dearborn, MI (US)

(72) Inventors: Venkatapathi Raju Nallapa, Fairfield, CA (US); Harpreetsingh Banvait, Sunnyvale, CA (US); Scott Vincent Myers, Camarillo, CA (US); Ashley Elizabeth Micks, Mountain View, CA (US)

(73) Assignee: Ford Global Technologies, LLCS, Dearborn, MI (US)

( * ) Notice: Subject to any disclaimer, the term of this patent is extended or adjusted under 35 U.S.C. 154(b) by 0 days.

(21) Appl. No.: 14/872,816

(22) Filed: Oct. 1, 2015

(65) Prior Publication Data

US 2017/0096102 A1    Apr. 6, 2017

(51) Int. Cl.
*B60Q 1/48* (2006.01)
*B60Q 9/00* (2006.01)
*G08G 1/16* (2006.01)

(52) U.S. Cl.
CPC ............ *B60Q 9/002* (2013.01); *B60Q 9/005* (2013.01); *B60Q 9/006* (2013.01); *B60Q 9/007* (2013.01); *G08G 1/168* (2013.01)

(58) Field of Classification Search
CPC .. B60R 2300/806; B60Q 9/006; B60Q 9/005; B60Q 9/007; B60Q 9/008
USPC .................................................. 340/435–440
See application file for complete search history.

(56) References Cited

U.S. PATENT DOCUMENTS

| 6,172,601 B1* | 1/2001 | Wada ........................ B60R 1/00 |
| | | 340/435 |
| 7,321,305 B2* | 1/2008 | Gollu ................... G06Q 10/087 |
| | | 340/10.1 |
| 8,229,664 B2 | 7/2012 | Herbert |
| 8,514,282 B2* | 8/2013 | Imanishi ................... B60R 1/00 |
| | | 348/143 |
| 8,694,236 B2* | 4/2014 | Takagi .................. G01S 17/936 |
| | | 701/300 |
| 8,988,525 B2 | 3/2015 | Thompson |
| 8,989,963 B1* | 3/2015 | Yellambalase ....... B60G 17/019 |
| | | 280/5.514 |
| 2004/0153244 A1* | 8/2004 | Kellum ................. B60R 21/013 |
| | | 701/301 |

(Continued)

FOREIGN PATENT DOCUMENTS

DE    10053316    5/2003
EP    1308751     5/2002

*Primary Examiner* — Hai Phan
*Assistant Examiner* — Son M Tang
(74) *Attorney, Agent, or Firm* — David R. Stevens; Stevens Law Group

(57) ABSTRACT

Systems, methods and apparatuses are disclosed for assessing whether a vehicle will make contact with an obstacle. The systems, methods, and apparatuses may include an obstacle sensing component configured to determine a location and a dimension of an obstacle, a vehicle sensing component configured to determine a height of a point of the vehicle relative to the ground, and a notification component configured to provide an indication of a presence of the obstacle to assist a human driver or an automated driving system in parking the vehicle without making contact with the obstacle.

20 Claims, 6 Drawing Sheets

(56) References Cited

U.S. PATENT DOCUMENTS

| | | | |
|---|---|---|---|
| 2005/0231341 A1* | 10/2005 | Shimizu | B60Q 9/005 340/436 |
| 2009/0088918 A1* | 4/2009 | Takenaka | B60T 8/17551 701/31.4 |
| 2009/0122140 A1* | 5/2009 | Imamura | B60Q 9/005 348/148 |
| 2009/0271114 A1* | 10/2009 | Herbert | G08G 1/168 701/301 |
| 2010/0245574 A1* | 9/2010 | Imanishi | B60R 1/00 348/148 |
| 2011/0302214 A1* | 12/2011 | Frye | G06F 17/30247 707/802 |
| 2013/0093583 A1* | 4/2013 | Shapiro | G01S 15/931 340/436 |
| 2013/0297173 A1 | 11/2013 | Takagi | |
| 2014/0195114 A1* | 7/2014 | Tseng | B60G 17/015 701/37 |
| 2014/0300504 A1 | 10/2014 | Shaffer | |
| 2014/0347469 A1* | 11/2014 | Zhang | B60R 1/00 348/118 |
| 2015/0009062 A1 | 1/2015 | Herthan | |
| 2015/0084755 A1* | 3/2015 | Chen | G08G 1/16 340/435 |
| 2015/0235538 A1* | 8/2015 | Konigsberg | A61B 5/18 340/439 |
| 2016/0119587 A1* | 4/2016 | Tan | H04N 7/183 348/148 |

* cited by examiner

PARKING OBSTRUCTION LOCATOR AND HEIGHT ESTIMATOR

TECHNICAL FIELD

The disclosure relates generally to systems, methods, and apparatuses for detecting an obstruction that may cause damage to a vehicle or hinder the movement of a vehicle, and determining whether a vehicle is likely to make contact with the obstruction.

BACKGROUND

Automobiles provide a significant portion of transportation for commercial, government, and private entities. Due to the high cost and value of automobiles and potential harm to passengers and drivers, it is important that vehicle drivers and driving systems avoid collisions with other vehicles or objects.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
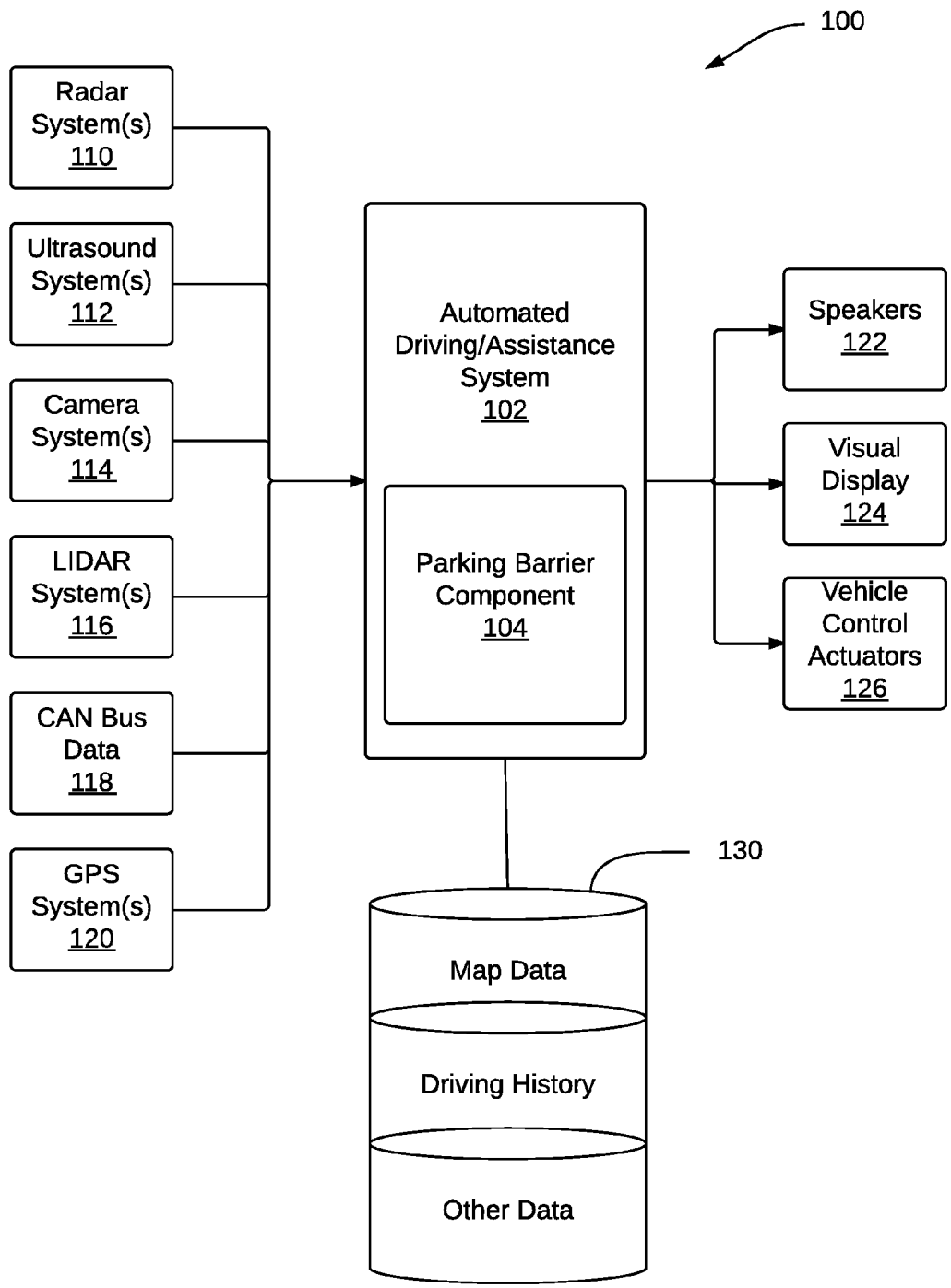
FIG. 1 is a schematic block diagram illustrating an implementation of a vehicle control system that includes an automated driving/assistance system.

A very common location for damage to vehicles occurs in parking locations. In many parking lots, or at other parking locations, parking stalls are marked or bounded on at least one side by a parking barrier, such as a curb, wheel stop, or the like. Parking barriers may be used to keep a vehicle from rolling into another row of vehicles and may stop a vehicle from moving too far forward or backward when the wheels encounter the barrier. Parking barriers can cause extensive damage to a vehicle if the height of the barrier exceeds the distance between the ground and either the front bumper, rear bumper, or side of the vehicle. For example, the parking barrier may scrape the underside of the front bumper if the vehicle is driven over the barrier, and this can lead to extensive vehicle damage.

When a vehicle approaches a parking stall, a human driver or automated driving system may identify a parking barrier and approximate an appropriate parking position. The human driver or driving system may pull into a position without making contact with the parking barrier or damaging the vehicle by colliding with the parking barrier. However, during parking or after parking, parking barriers are often out of view from the human driver or automated driving system and an appropriate parking position must be estimated to avoid damaging the vehicle by making contact with the parking barrier. For example, a human driver may be able to see or detect a parking barrier upon approaching a parking stall, but the driver may not be able to see the parking barrier from within the cab of the vehicle as the driver proceeds to pull into the parking position or approaches the parking barrier. Similarly, sensors of an autonomous driving system or driving assistance system may be directed to view regions near a vehicle, but a region under or on the ground near a front or rear bumper may be outside the field of view of the sensors. Thus, a human driver or a driving system is at risk of not detecting a parking barrier.

In view and recognition of the foregoing, the present application discloses systems, methods, and apparatuses for determining the location and dimensions of an obstacle, the location of a point on a vehicle relative to the ground, whether the vehicle is likely to make contact with the obstacle, and any necessary adjustments to vehicle height to avoid making contact with the obstacle.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, "obstacle" refers to an obstruction to a vehicle, including but not limited to, parking barriers, curbs, wheel stops, parking chocks, landscapes (e.g., rocks, trees, plants, and the like), signs, fences, buildings, roadblocks, road medians, and other structures.

As used herein, "driver" refers to either or both of a human driver or an automated driving system.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Referring now to the figures, FIG. 1 illustrates a vehicle control system 100 that includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving, but may provide notifications and alerts to assist a human driver in driving safely. The automated driving/assistance system 102 includes a parking barrier component 104, which may determine that an obstacle is present, sense the location and dimensions of the obstacle, sense the height of the vehicle, and may determine whether the vehicle is likely to make contact with the obstacle. The parking barrier component 104 may notify or alert a human driver or the automated driving/assistance system 102 of the presence of the obstacle, the likelihood that the vehicle will make contact with the obstacle, and any necessary adjustments to vehicle height to avoid making contact with the obstacle.

The vehicle control system 100 also includes one or more sensor systems/devices for detecting a presence of nearby objects or determining a location of the vehicle or surrounding objects. For example, the vehicle control system 100 may include one or more of any of the following: radar systems 110, ultrasound systems 112, camera systems 114, LIDAR systems 116, data from a controller area network bus (CAN bus) 118, and/or a GPS system 120. The vehicle control system 100 may include a vehicle system data store 130 for storing relevant or useful data for navigation and safety such as map data, driving history, or other data. In one embodiment, the vehicle system data store 130 may store information relating to the presence and dimensions of an obstacle, the location of the obstacle, and any required adjustment to vehicle height to avoid making contact with the obstacle. The vehicle control system 100 may include vehicle control actuators 126 to control various aspects of the driving of the vehicle, such as electric motors, switches or other actuators, to control braking, acceleration, steering or the like. In the present disclosure, the vehicle control actuators 126 may include an active suspension system of the vehicle that may adjust the height of the vehicle, such that a portion of the vehicle can drive over an obstacle without making contact with the obstacle. The vehicle control system 100 may also include one or more speakers 122, visual displays 124, or other devices that may provide notifications to a human driver or passenger. The speakers 122 may include one or more speakers of a sound system of the vehicle or may include a speaker dedicated to driver notification. The visual display 124 may include a heads-up display, a dashboard display or indicator, a display screen, or any other visual indicator, which may be seen by a driver or passenger of the vehicle.

It will be appreciated that the embodiment of FIG. 1 is given by way of example only. Other embodiments may include fewer or additional components without departing from the scope of the disclosure. Additionally, illustrated components may be combined or included within other components without limitation. For example, the parking barrier component 104 may be separate from the automated driving/assistance system 102 and the data store 130 may be included as part of the automated driving/assistance system 102 and/or part of the parking barrier component 104 without departing from the scope of the disclosure.

The radar system 110 may include any radar system known in the art. Radar system operations and performance are generally well understood. In general, a radar system 110 operates by transmitting radio signals and detecting reflections off objects. In ground applications, the radar may be used to detect physical objects, such as other vehicles, parking barriers or parking chocks, curbs, landscapes, road edges, signs, buildings, or other objects. The radar system 110 may use the reflected radio waves to determine a size, shape, distance, surface texture, or other information about a physical object or material. For example, the radar system 110 may sweep an area to obtain data or objects within a specific range and viewing angle of the radar system 110. In one embodiment, the radar system 110 is configured to generate perception information from a region near the vehicle, such as one or more regions nearby or surrounding the vehicle. For example, the radar system 110 may obtain data about regions of the ground or vertical area immediately neighboring or near the vehicle. The radar system 110 may include one of many commercially available radar systems. In one embodiment, the radar system 110 may provide perception data including a two dimensional or three-dimensional map or model to the automated driving/assistance system 102 for reference or processing. The parking barrier component 104 may utilize this data to determine whether any portion of the vehicle is likely to make contact with a parking obstacle.

The ultrasound system 112 may be used to detect objects or distances between a vehicle and objects using ultrasound waves. For example, the ultrasound system 112 may emit ultrasound waves from a location on or near a bumper or side panel location of a vehicle. The ultrasound waves, which can travel short distances through air, may reflect off other objects and be detected by the ultrasound system 112. Based on an amount of time between emission and reception of reflected ultrasonic waves, the ultrasound system 112 may be able to detect accurate distances between a portion of the vehicle, such as a bumper or side panel, and any other objects.

The camera system 114 may include one or more cameras, such as visible wavelength cameras or infrared cameras. The camera system 114 may provide video feed or periodic images, which can be processed for object detection, road identification and positioning, or other detection or positioning. In one embodiment, the camera system 114 may include two or more cameras, which may be used to provide ranging for objects within view. The camera system 114 may be used to detect a presence of a nearby obstacle before other sensors are within range to detect either of the presence of the obstacle or any specific location or dimension data concerning the obstacle. In one embodiment, the camera system may detect a presence of a nearby obstacle and initiate the parking barrier component 104 to determine a precise location and dimension of the obstacle, a height of a portion of the vehicle, and whether the vehicle is likely to make contact with the obstacle.

The LIDAR system 116 may include any LIDAR system known in the art. Principles of operation and performance of LIDAR systems are generally well understood. In general, the LIDAR system 116 operates by emitting visible wavelength or infrared wavelength lasers and detecting reflections of the laser light off objects. In ground applications, the lasers may be used to detect physical objects, such as other vehicles, parking barriers or parking chocks, curbs, landscapes, road edges, signs, buildings, or other objects. The LIDAR system 116 may use the reflected laser light to determine a size, shape, distance, surface texture, or other information about a physical object or material. For example, the LIDAR system 116 may sweep an area to obtain data or objects within a specific range and viewing angle of the LIDAR system 116. For example, the LIDAR system 116 may obtain data about regions of the ground or vertical area immediately neighboring or near the vehicle. The LIDAR system 116 may include one of many commercially available LIDAR systems. In one embodiment, the LIDAR system 116 may provide perception data including a two dimensional or three-dimensional model or map of detected objects or surfaces.

The CAN bus data 118, also known as controller area network bus data, may include data from any CAN bus known in the art. Principles of operation of the CAN bus are generally well known in the art. In general, a CAN bus is a vehicle bus standard designed to connect electronic control units (ECUs) wherein each ECU may send and receive messages in real-time. Devices communicating with the CAN bus may include oxygen sensors, temperature gauges, inclinometers, dynamometers, ammeters, hydrometers, mass flow sensors, light sensors, and the like. In one embodiment, data including vehicle velocity, vehicle pitch, and vehicle height may be particularly useful in determining the likelihood that the vehicle will make contact with an obstacle. For example, data from the CAN bus indicating vehicle height and vehicle pitch might be used to calculate a height of the under portion of the front bumper of the vehicle, and this calculation may be further used to determine whether the vehicle will scrape against a nearby obstacle.

The GPS system 120 is one embodiment of a positioning system that may provide a geographical location of the vehicle based on satellite or radio tower signals. GPS systems 120 are well known and widely available in the art. Although GPS systems 120 can provide very accurate positioning information, GPS systems 120 generally provide little or no information about distances between a vehicle and other objects. Rather, they simply provide a location, which can then be compared with other data, such as maps, to determine distances to other objects, roads, or locations of interest. In one embodiment, data from a GPS system may be coupled with data from one or more of a radar sensor, ultrasound sensor, LIDAR sensor, or camera to store information about the presence and dimensions of an obstacle in a specific location. This information may be stored and later recovered to alert a human driver or automated driving system of the presence and dimensions of a nearby obstacle before the vehicle is close enough to the obstacle for one or more of the radar sensor, ultrasound sensor, LIDAR sensor, or camera to detect the obstacle in real-time.

The vehicle system data store 130 stores map data, a driving history, and other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for each parking stall in a parking lot or for parking stalls along a road. In one embodiment, the map data includes location data about one or more structures or objects on or near the roads or parking locations and the dimensions of the those structures.

The vehicle system data store 130 may include a driving history. The driving history (or drive history) may include location data for past trips or parking locations of the vehicle. For example, the driving history may include GPS location data for the previous trips or paths taken. In one embodiment, the driving history may include information about the location of obstacles such as parking barriers, curbs, landscapes, and the like. For example, each time a vehicle is parked the parking barrier component 104 may be used to detect a parking barrier or curb and store an indication in the vehicle system data store 130 of the existence or presence of the parking barrier or curb and the dimensions of the parking barrier or curb. The distance or relative location data may be determined based on GPS data, radar data, LIDAR data, camera data, or other sensor data gathered during the previous or past trips taken by the vehicle. This driving history data may be logged by the automated driving/assistance system 102 for future use if/when sensor data fails. For example, by saving detailed lane location, sign location, or other data, the automated driving/assistance system 102 may be able to determine an extremely precise location based on radar data only (or a combination of radar and any other available location/ navigation data). In one embodiment, the automated driving/ assistance system 102 is configured to log driving data to the vehicle system data store 130 for and during any trips or drives taken by the vehicle.

In one embodiment, the automated driving/assistance system 102 is configured to control driving or navigation of a parent vehicle. For example, the automated driving/assistance system 102 may control the vehicle control actuators 126 to drive a path on a road, parking lot, driveway, or other location. For example, the automated driving/assistance system 102 may determine a path based on information or perception data provided by any of the components 110-120 or any of the data stored in the vehicle system data store 130.

Figure 2:
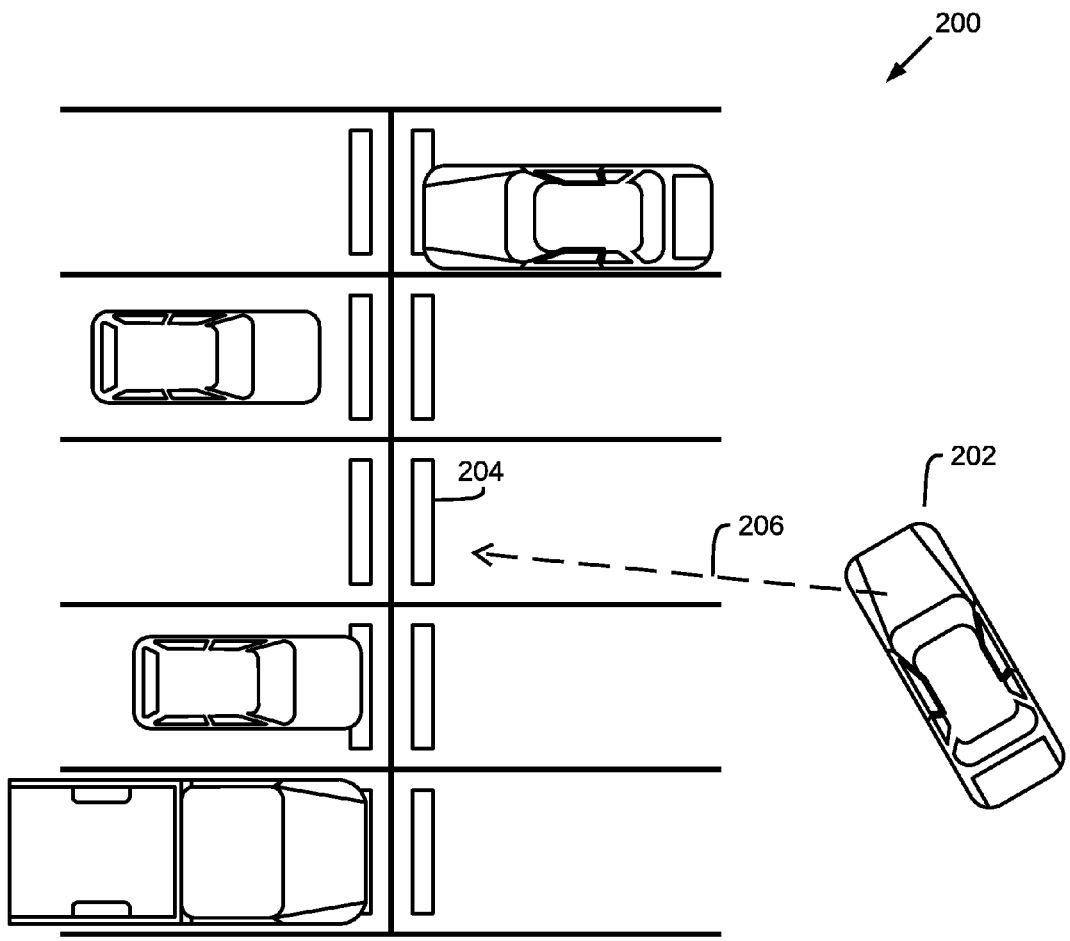
FIG. 2 is a schematic top view diagram illustrating a parking lot, according to one embodiment.

Referring now to FIG. 2, a top view diagram of a parking lot 200 with a plurality of parking locations is shown. A vehicle 202 is shown as it is approaching or pulling into a specific parking stall having a parking barrier 204. The parking barrier 204 includes a parking chock. Embodiments of parking chocks include concrete, rubber, or other barriers, which are placed at parking locations to prevent vehicles from pulling or rolling too far in one or more directions. The parking lot 200 includes a parking barrier 204 for each parking stall. However, some parking stalls may be missing a parking barrier 204 or the parking stalls may be inconsistent with inclusion of parking barriers 204 so that a driver or system cannot assume that a specific parking stall does or does not include a parking barrier 204 based on other parking stalls. According to one embodiment, as indicated by line 206, as the vehicle 202 pulls into the parking stall the parking barrier component 104 detects the location and dimensions of the parking barrier 204, determines the height of a portion of the vehicle relative to the ground, determines whether the vehicle is likely to make contact with the parking barrier 204, and notifies a driver, such as a human driver or an automated driving system, of any relevant determinations. It will be appreciated that the portion of the vehicle 202 that is sensed relative to the ground is related to an area of the vehicle 202 that may potentially contact (or go over) the parking barrier 204. Thus, it will be understood that in many situations the portion or area of the vehicle 202 that is likely to make contact with the barrier 204 is the front portion of the vehicle 202. However, the portion or area of the vehicle 202 that is likely to make contact with the barrier 204 could also be the back portion of the vehicle 202, such as when backing the vehicle 202 into the parking stall. Thus, the system is concerned with the height of the relevant portion of the vehicle 202 from the ground that may contact the barrier 204.

Once the vehicle 202 is parked, the parking barrier 204 may no longer be visible to a human within the cab of the vehicle 202 or to one or more sensors of the vehicle 202. When the vehicle is turned off, or a driver leaves the vehicle, information about the location and dimensions of the parking barrier 204 may be retained in memory. Upon return of a driver, upon starting the vehicle 202, or upon occurrence of another event that indicates the vehicle 202 is leaving or preparing to leave the parking stall, the parking barrier component 104 may retrieve data concerning the parking barrier 204. Thus, the system may store data regarding the existence of a parking barrier 204 when entering a parking stall and, at a later time, remind the human driver or automated driving system of the parking barrier 204 when preparing to exit the parking stall. For example, the driver may be notified when the driver starts up the vehicle again, gets back in the vehicle, or otherwise indicates that they are ready to drive. Similarly, an automated driving system may check the drive history to determine whether the barrier 204 is there and whether the vehicle is likely to collide with the barrier 204.

Although FIG. 2 illustrates a plan view of a parking lot, vehicles may be parked in a wide variety of locations where parking barriers 204 or curbs may be present. For example, road-side parking, driveway parking, or any other parking location may also include a parking barrier, parking chock, wheel stop, curb, or other object to define parking locations or parking stalls.

Figure 3:
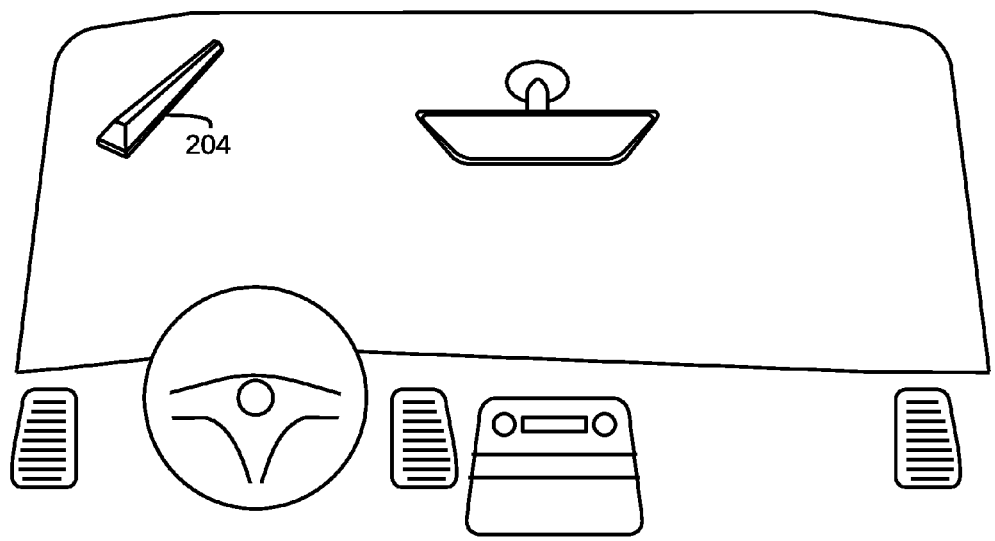
FIG. 3 is a schematic diagram illustrating a view of a parking barrier through a windshield of a vehicle.

FIG. 3 illustrates a cab view through a windshield of the vehicle 202 as the vehicle 202 approaches the parking barrier 204. As the vehicle 202 pulls into the parking stall the parking barrier 204 is visible to a driver (and/or one or more sensors). During the approach, the parking barrier component 104 may detect the location and dimensions of the parking barrier 204 and the height of a portion of the vehicle 202 relative to the ground, and make a determination of whether the vehicle is likely to collide with the parking barrier 204 while the human driver or automated driving system parks the vehicle 202.

Figure 4:
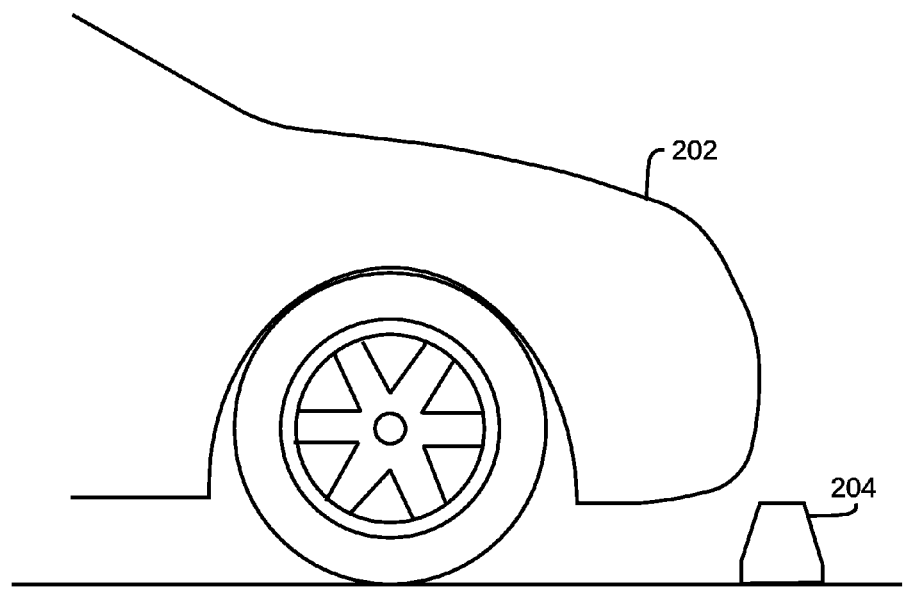
FIG. 4 is a schematic diagram illustrating a side view of a vehicle parked near a parking barrier.

FIG. 4 illustrates a side view of the vehicle 202 and parking barrier 204 after the vehicle 202 has parked. The parking barrier 204 is not visible through a windshield of the vehicle 202 and one or more sensors mounted on or near the hood or roof of the vehicle 202 also may not be able to detect the parking barrier 204.

Figure 5:
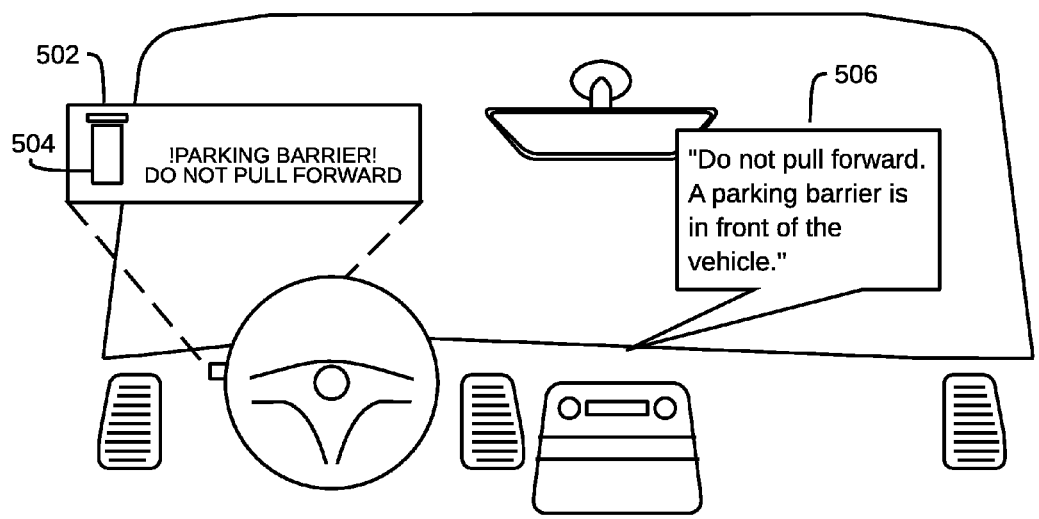
FIG. 5 is a schematic diagram illustrating notifications provided to a driver or a passenger of a vehicle.

FIG. 5 illustrates a cab view through a windshield of the vehicle after the vehicle 202 has been parked near the parking barrier 204 (not visible in FIG. 5). To a driver, or one or more sensors, the likely location of a parking barrier 204 is not visible. Thus, a human driver or automated driving system is in danger of driving the vehicle 202 forward over the parking barrier 204, which may cause damage to the vehicle 202 or cause the vehicle 202 to get high centered or stuck. However, a notification may be provided to the driver (or automated driving/assistance system 102) by the parking barrier component 104 that the parking barrier 204 is present. Specifically, a visual indication 502 in the dash is illustrated with an icon 504 indicating the presence of the parking barrier 204 with the words "!PARKING BARRIER! DO NOT PULL FORWARD." It will be appreciated that other written indication may be provided to alert a driver of the presence of the parking barrier 204. The icon 504 stylistically and visually indicates the vehicle 202 with a barrier 204 in front of it. In one embodiment, the barrier in the icon 504 may be a different color than the vehicle to indicate that it could be a hazard. An audio message 506 may be played audibly so that a driver hears instructions even if the driver does not see the visual indication 502. The audio and visual messages of FIG. 5 are given by way of example only and may vary considerably in different embodiments.

Figure 6:
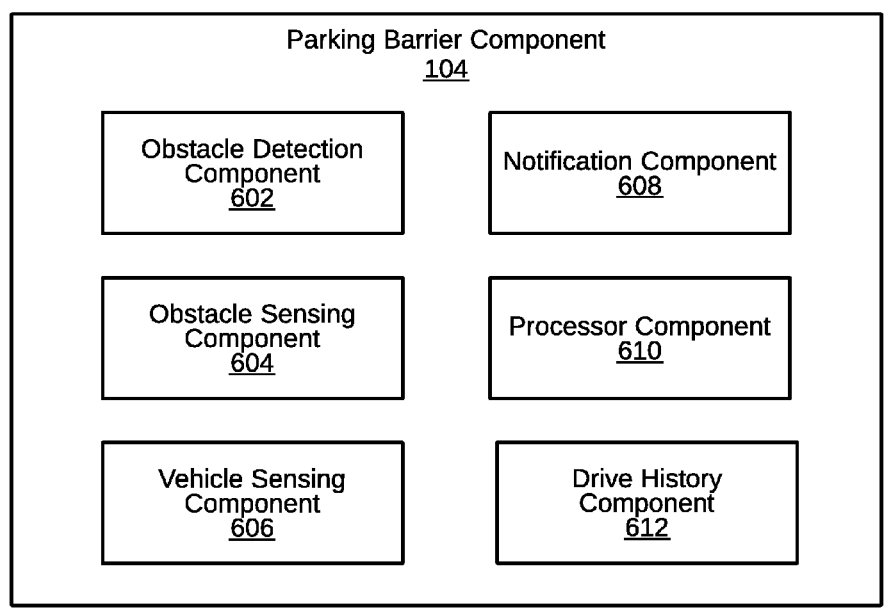
FIG. 6 is a schematic block diagram illustrating example components of a parking barrier component, according to one implementation.

FIG. 6 is a block diagram illustrating example components of the parking barrier component 104. In the depicted embodiment, the parking barrier component 104 includes an obstacle detection component 602, an obstacle sensing component 604, a vehicle sensing component 606, a notification component 608, a processor component 610, and a drive history component 612. The components 602-612 are given by way of illustration only and may not all be included in all embodiments. Some embodiments may include only one or any combination of two or more of the components 602-612 and some of the components 602-612 may be located outside the parking barrier component 104, such as within the automated driving/assistance system 102 or elsewhere without departing from the scope of the disclosure.

The obstacle detection component 602 is configured to detect the presence of a nearby obstacle, such as a parking barrier 204. In one embodiment, the obstacle detection component 602 is configured to detect an obstacle based on information from one or more sensors that are obtaining data about objects near the vehicle 202.

In one embodiment, the obstacle detection component 602 detects the presence of a nearby obstacle using the vehicle's camera system 114. The camera system 114 detects the presence of an obstacle before other systems, such as a radar system 110, an ultrasound system 112, or a LIDAR system 116 are within range to detect the presence of the obstacle. In such an embodiment, the camera system 114 may alert the parking barrier component 104 of the presence of the obstacle, and the parking barrier component 104 may then detect more precise information about the location and dimensions of the obstacle using one or more other systems or sensors, such as systems 110, 112, 116, 118, 120.

In one embodiment, the obstacle detection component 602 detects the presence of a nearby obstacle by coupling real-time data from the GPS system 120 with stored data in the vehicle history data store 130. In such an embodiment, the vehicle history data store 130 would include data about a nearby obstacle (e.g. location and dimensions of the obstacle and any required adjustments to vehicle height to avoid making contact with the obstacle) that was stored when the vehicle previously encountered the same obstacle in the same GPS location, and the data would correspond to the real-time GPS location data of the vehicle 202. The obstacle detection component 602 could therefore detect the presence of the obstacle before other real-time sensors may detect the presence of the obstacle.

The obstacle sensing component 604 is configured to sense and determine information about the obstacle, including the location of the obstacle and the height, width, and depth of the obstacle. In one embodiment, the obstacle sensing component 604 is configured to detect such information based on data from one or more sensors. For example, the obstacle sensing component 604 may receive data from one or more of the radar system 110, the ultrasound system 112, the camera system 114, the LIDAR system 116, and the GPS system 120. Each system may have a different range or field of view, and as such, the obstacle sensing component 604 may receive data from each of the systems at different times as the vehicle 202 approaches the obstacle. The obstacle sensing component 604 may also receive data from the vehicle system data store 130. For example, the obstacle sensing component 604 may receive data stored during previous trips to the same location.

The vehicle sensing component 606 is configured to sense and determine information about the vehicle 202, including the height of a point on the vehicle relative to the ground. In one embodiment, the vehicle sensing component 606 is configured to detect such information based on data from one or more sensors or data systems. For example, the vehicle sensing component 606 may receive data from one or more of the radar system 110, the ultrasound system 112, the camera system 114, the LIDAR system 116, the CAN bus data 118, and the GPS system 120. The vehicle sensing component 606 may also receive data from the vehicle system data store 130. In one embodiment, the vehicle sensing component 606 receives data from the CAN bus including vehicle height, vehicle pitch, and vehicle velocity, and the vehicle sensing component 606 uses that data to determine the heights of points of the vehicle relative to the ground. In one embodiment, the vehicle sensing component 606 determines the height of points of the under portion of the front bumper of the vehicle 202 relative to the ground.

The notification component 608 is configured to provide an indication of one or more of the presence, the location, and the dimensions of the obstacle and the height of a point on the vehicle 202 relative to the ground, to assist a human driver or an automated driving system in parking the vehicle without making contact with the obstacle. For example, if a human driver is driving the vehicle 202, a visual or audio notification may be provided within the cab of the vehicle 202 (See FIG. 5) to indicate that an obstacle is present. In such an embodiment, the notification component 608 may send a signal to a speaker 122 or visual display 124. In one embodiment, the notification component 608 may provide an indication by sending a signal or message to the automated driving system. Such a signal may include each of the location and dimensions of the obstacle and the height of a point on the vehicle 202 relative to the ground. For example, the notification component 608 may further indicate that the obstacle is in front of, behind, or at some other location with respect to the vehicle 202. The notification component 608 may further indicate a likelihood that the vehicle 202 will make contact with the obstacle or a recommendation that the vehicle 202 partially drive over the obstacle or completely avoid the obstacle.

In one embodiment, the notification component 608 provides an indication to an automated driving system, vehicle control actuators 126, or an active suspension system. In one embodiment, the notification component 608 provides an indication that includes the location and dimensions of the obstacle and the height of a point on the vehicle 202 relative to the ground to an active suspension system, and further directs the active suspension system to adjust the height of the vehicle 202, such that a portion of the vehicle 202 may drive over the obstacle without making contact with the obstacle. For example, the notification component 608 may utilize data from the obstacle sensing component 604 and the vehicle sensing component 606 to direct the active suspension system to lift the front bumper of the vehicle 202, such that at least a portion of the vehicle 202 may drive over a parking barrier 204 without scraping the underside of the front bumper.

The processor component 610 is configured to utilize data from the obstacle sensing component 604 and the vehicle sensing component 606 to determine one or more of a likelihood that the vehicle 202 will make contact with the obstacle, a required adjustment in vehicle height to avoid making contact with the obstacle, and whether a portion of the vehicle 202 can drive over the obstacle without making contact with the obstacle. The processor component 610 may determine whether the vehicle 202 will make contact with the obstacle by outputting a multi-axis location of the obstacle and a height of the obstacle with reference to a body coordinate system of the vehicle 202 to determine whether a portion of the vehicle body can travel over the obstacle without making contact with the obstacle. The body coordinate system of the vehicle comprises x, y, and z coordinates relative to an origin located at some point in the vehicle. The processor component 610 may output an (x, y, z) coordinate of the location of the obstacle and the height of the obstacle relative to the origin of the vehicle's body coordinate system. The processor component 610 may further use this coordinate in conjunction with a known coordinate of a point on the vehicle 202 (e.g., the underside of the front bumper) to determine if the point on the vehicle 202 can travel over the obstacle without making contact with the obstacle.

The drive history component 612 comprises a data store of drive history and is configured to store an indication of the presence of the obstacle and/or any related data concerning the obstacle, including the location and dimensions of the obstacle. For example, the drive history component 612 may update the driving history in the vehicle system data store 130 to include an indication that the obstacle is present at a specific location, such as a specific parking stall or specific portion of a road side. In one embodiment, the drive history component 612 may be updated to indicate a position of the obstacle with respect to the vehicle 202. For example, the drive history may include information about whether the obstacle is in front of, behind, or beneath the vehicle 202, or whether the height of the vehicle 202 must be adjusted to avoid making contact with the obstacle. In one embodiment, the notification component 608 directs the drive history component 612 to update a drive history to include an indication of one or more of a presence of the obstacle, a location of the obstacle, a dimension of the obstacle, whether the vehicle 202 is likely to make contact with the obstacle, and a required adjustment to the vehicle height to avoid making contact with the obstacle.

Figure 7:
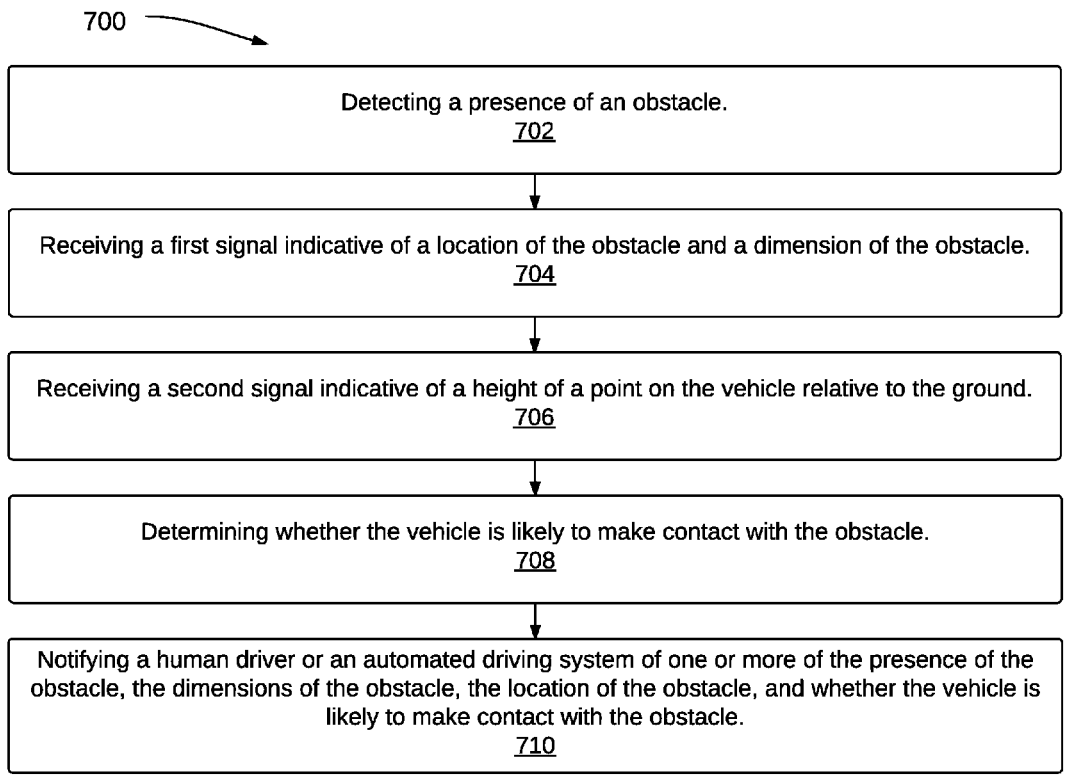
FIG. 7 is a schematic flowchart diagram illustrating a method for detecting and assessing an obstacle, according to one implementation.

FIG. 7 depicts a schematic flow chart diagram of a method 700 for assessing and avoiding an obstacle. The method 700 may be performed by an automated driving/assistance system or a parking barrier component, such as the automated driving/assistance system 102 or the parking barrier component 104 of FIG. 1.

The method 700 begins and the obstacle detection component 602 detects a presence of an obstacle at 702. The obstacle sensing component 604 receives a first signal indicative of a location of the obstacle and a dimension of the obstacle at 704. The vehicle sensing component 606 receives a second signal indicative of a height of a point on the vehicle 202 relative to the ground at 706. The processor component 610 determines whether the vehicle 202 is likely to make contact with the obstacle at 708. The notification component 608 notifies a driver, such as a human driver or an automated driving system, of one or more of the presence of the obstacle, the dimensions of the obstacle, the location of the obstacle, and whether the vehicle 202 is likely to make contact with the obstacle at 710.

The method 700 depicts only one possible embodiment of the present disclosure. The method may include additional or fewer steps and the steps may not occur in the same order as depicted in the method 700 of FIG. 7. For example, receiving the first signal at 704 and receiving the second signal at 706 need not be received in sequence and either of the first signal or the second signal may be received first-in-time or the signals may be received simultaneously. Further, the notification component 608 may notify a human driver or an automated driving system of one or more of the listed notifications before the processor component 610 makes a determination at 708. Further, the processor component 610 may not be included in the automated driving/assistance system 102 or parking barrier component 104, and may instead be included in, for example, a vehicle control actuator 126 or an active suspension system.

Figure 8:
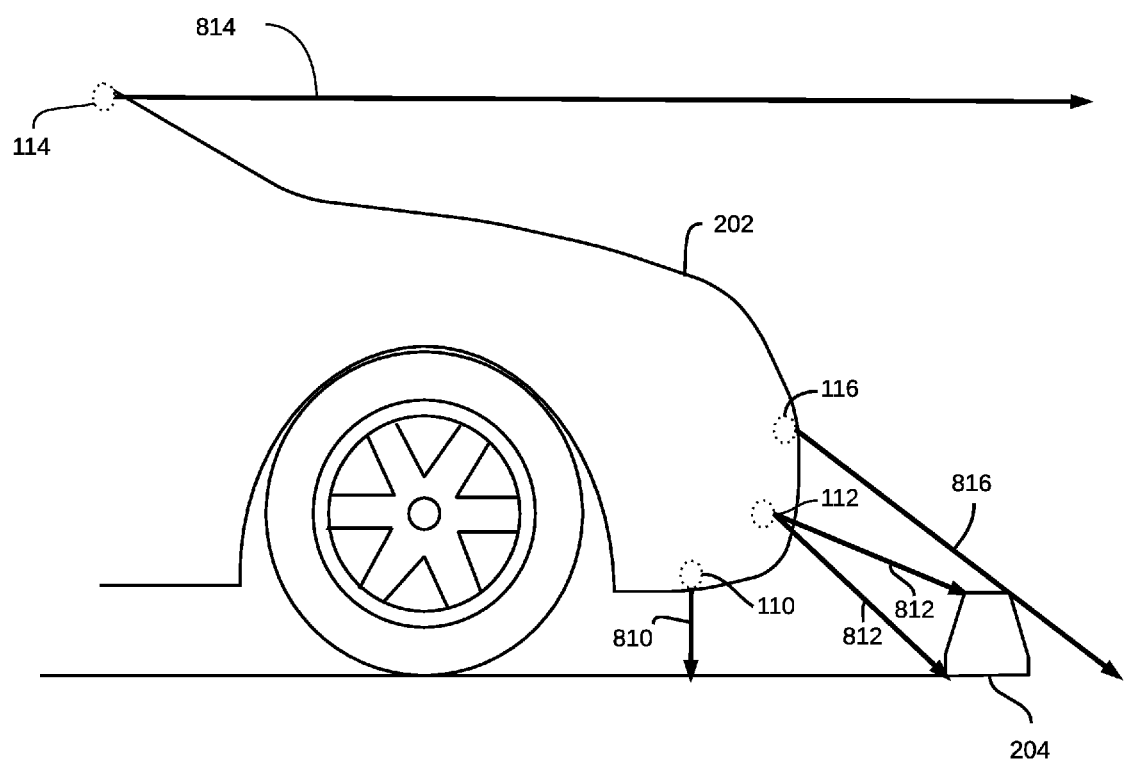
FIG. 8 is a schematic diagram illustrating a vehicle approaching a parking barrier while sensing the surrounding area.

FIG. 8 illustrates a side view of a vehicle 202 approaching a parking barrier 204. In this embodiment, the vehicle 202 is engaging four sensing systems, namely a radar system 110, an ultrasound system 112, a camera system 114, and a LIDAR system 116, to assess whether the vehicle 202 will make contact with the parking barrier 204. In one embodiment, the radar system 110 senses the height of the vehicle relative to the ground at 810, the ultrasound system 112 senses a multitude of points 812 on the parking barrier 204, the LIDAR system 116 senses a multitude of points 816 on the parking barrier 204, and the camera system 114 senses a multitude of points 814 in front of the vehicle 202. It will be appreciated that FIG. 8 represents only one embodiment of the present disclosure and that a vehicle 202 could be equipped with other various sensing systems and the sensing systems could be used in any possible manner. For example, the vehicle 202 may have a camera system 114 mounted to the exterior of the vehicle 202, and the camera system 114 may use visible wavelength cameras or infrared cameras to sense the surrounding area, including the location, height, and width of a nearby parking barrier 204. In another embodiment, the vehicle 202 may have an ultrasound system 112 used to sense the height of the vehicle 202 relative to the ground. In another embodiment, the vehicle 202 may have a radar system 110 used to sense various points on the parking barrier 204 to determine the location, height, and width of the parking barrier 204.

EXAMPLES

The following examples pertain to further embodiments.

Example 1 is a system comprising: an obstacle sensing component configured to determine a location and a dimension of an obstacle, a vehicle sensing component configured to determine a height of a point on the vehicle relative to the ground, and a notification component configured to provide an indication of a presence of the obstacle to assist a human driver or an automated driving system in parking the vehicle without making contact with the obstacle.

Example 2 comprises the system of Example 1, wherein the obstacle sensing component receives data from one or more of a radar system, an ultrasound system, a LIDAR system, a camera system, a GPS system, and a vehicle data storage device.

Example 3 comprises the system of Example 1, wherein the vehicle sensing component receives data from one or more of a radar system, an ultrasound system, a LIDAR system, a camera system, a GPS system, a vehicle data storage device, and a CAN bus.

Example 4 comprises the system of Example 1, wherein the notification component further provides an indication of a likelihood that the vehicle will make contact with the obstacle.

Example 5 comprises the system of Example 1, wherein the notification component directs an active suspension component of the vehicle to adjust the height of the vehicle such that a portion of a vehicle body can drive over the obstacle without making contact with the obstacle.

Example 6 comprises the system of Example 1, further comprising a processor configured to determine whether the vehicle will make contact with the obstacle by outputting a multi-axis location of the obstacle and a height of the obstacle with reference to a body coordinate system of the vehicle to determine whether a portion of a vehicle body can travel over the obstacle without making contact with the obstacle.

Example 7 comprises the system of Example 1, wherein the notification component directs a drive history component of the vehicle to update a drive history to include an indication of one or more of a presence of the obstacle, a location of the obstacle, a dimension of the obstacle, whether the vehicle is likely to make contact with the obstacle, and a required adjustment to a vehicle height to avoid making contact with the obstacle.

Example 8 comprises the system of Example 1, further comprising an obstacle detection component configured to detect a presence of an obstacle.

Example 9 comprises the system of claim 8, wherein the obstacle detection component is configured to utilize a vehicle location and a stored vehicle data to detect a presence of an obstacle.

Example 10 is a method of detecting and assessing an obstacle comprising: detecting a presence of an obstacle, receiving a first signal indicative of one or more of a location of the obstacle and a dimension of the obstacle, receiving a second signal indicative of a height of a point on a vehicle relative to the ground, determining whether the point on the vehicle is likely to make contact with the obstacle, and notifying a human driver or an automated driving system of one or more of the presence of the obstacle, the location of the obstacle, the dimension of the obstacle, and whether the vehicle is likely to make contact with the obstacle. It will be appreciated that either of the first signal or the second signal may be received first-in-time, and the signal may be received simultaneously.

Example 11 comprises the method of Example 10, wherein the first signal comprises data from one or more of a radar system, an ultrasound system, a LIDAR system, a camera system, a GPS system, and a vehicle data storage device.

Example 12 comprises the method of Example 10, wherein the second signal comprises data from one or more of a radar system, an ultrasound system, a LIDAR system, a camera system, a GPS system, a vehicle data storage device, and a CAN bus.

Example 13 comprises the method of Example 10, further comprising directing an active suspension component of the vehicle to adjust a height of the vehicle such that a portion of the vehicle can drive over the obstacle without making contact with the obstacle.

Example 14 comprises the method of Example 10, wherein notifying the human driver comprises providing one or more of a visual indication and an audio indication.

Example 15 comprises the method of Example 10, further comprising assisting the human driver in parking the vehicle without making contact with the obstacle.

Example 16 comprises the method of Example 10, wherein detecting the presence of the obstacle comprises recalling a drive history data indicating the presence of the obstacle at the vehicle's location.

Example 17 comprises the method of Example 10, further comprising directing a drive history component of the vehicle to update a drive history to indicate one or more of a presence of the obstacle, a location of the obstacle, a dimension of the obstacle, a likelihood that a portion of the vehicle will make contact with the obstacle, and a required adjustment to a vehicle height such that a portion of the vehicle can drive over the obstacle without making contact with the obstacle.

Example 18 comprises the method of Example 10, wherein determining whether the point on the vehicle is likely to make contact with the obstacle comprises outputting a multi-axis location of the obstacle and a height of the obstacle with reference to a body coordinate system of the vehicle to determine whether the point on the vehicle can travel over the obstacle without making contact with the obstacle.

Example 19 comprises the method of Example 10, further comprising directing an automated driving system in parking the vehicle without making contact with the obstacle or assisting a human driver in parking the vehicle without making contact with the obstacle.

Example 20 comprises the method of Example 10, wherein notifying the automated driving system comprises providing an indication of a multi-axis location of the obstacle and a multi-axis height of the obstacle relative to a vehicle body coordinate system.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
    an obstacle sensing component configured to determine a location and a dimension of an obstacle, wherein the dimension comprises a height of the obstacle with respect to a ground surface;
    a vehicle sensing component configured to determine a height of a point on a vehicle relative to the ground surface, wherein the vehicle sensing component determines the height based on sensor data;
    a drive history component configured to:
        update a drive history to include an indication of a presence and the height of the obstacle in response to the vehicle parking at a location near the obstacle;
        retain the location of the obstacle in memory in response to parking the vehicle or the vehicle being turned off; and
        check the drive history for information about any obstacles near the parking location in response to the vehicle or driver preparing to exit the parking location; and
    a notification component configured to provide an indication of a presence of the obstacle to assist a driver or vehicle in exiting the parking location without making contact with the obstacle.

2. The system of claim 1, wherein the obstacle sensing component receives data from one or more of a radar system, an ultrasound system, a LIDAR system, a camera system, a GPS system, and a vehicle data storage device.

3. The system of claim 1, wherein the vehicle sensing component receives data from one or more of a radar system, an ultrasound system, a LIDAR system, a camera system, a GPS system, a vehicle data storage device, and a CAN bus.

4. The system of claim 1, wherein the notification component further provides an indication of a likelihood that the vehicle will make contact with the obstacle if the vehicle passes over the obstacle.

5. The system of claim 1, wherein the notification component directs an active suspension component of the vehicle to adjust the height of the vehicle such that a portion of a vehicle body can drive over the obstacle without making contact with the obstacle.

6. The system of claim 1, further comprising a processor component configured to determine whether the vehicle will make contact with the obstacle by outputting a multi-axis location of the obstacle and a height of the obstacle with reference to a body coordinate system of the vehicle to determine whether a portion of a vehicle body can travel over the obstacle without making contact with the obstacle.

7. The system of claim 1, wherein the drive history component is further configured to store an indication that the vehicle is likely to make contact with the obstacle or a required adjustment to a vehicle height to avoid making contact with the obstacle.

8. The system of claim 1, further comprising an obstacle detection component configured to detect a presence of an obstacle.

9. The system of claim 8, wherein the obstacle detection component is further configured to utilize a vehicle location and stored drive history data to detect a presence of an obstacle.

10. A method comprising:
    detecting a presence of an obstacle;
    receiving an indication of one or more of a location of the obstacle and a dimension of the obstacle;
    determining a height of a point on a vehicle relative to the ground;
    determining whether the point on the vehicle is likely to make contact with the obstacle;
    updating a drive history to include an indication of a presence and the height of the obstacle in response to the vehicle parking at a location near the obstacle;
    retaining the location of the obstacle in memory in response to parking the vehicle or the vehicle being turned off;
    checking the drive history for information about any obstacles near the parking location in response to the vehicle or driver preparing to exit the parking location;
    notifying a driver of one or more of the presence of the obstacle, the location of the obstacle, the dimension of the obstacle, or whether the point on the vehicle is likely to make contact with the obstacle to assist a driver or vehicle in exiting the parking location.

11. The method of claim 10, wherein receiving the indication of one or more of the location and the dimension comprises receiving data from one or more of a radar system, an ultrasound system, a LIDAR system, a camera system, a GPS system, and a vehicle data storage device.

12. The method of claim 10, wherein determining the height of the point on the vehicle relative to the ground comprises determining based on data from one or more of a radar system, an ultrasound system, a LIDAR system, a camera system, a GPS system, a vehicle data storage device, and a CAN bus.

13. The method of claim 10, further comprising directing an active suspension system of the vehicle to adjust a height of the vehicle such that a portion of the vehicle can drive over the obstacle without making contact with the obstacle.

14. The method of claim 10, wherein notifying the driver comprises providing one or more of a visual indication and an audio indication.

15. The method of claim 10, further comprising assisting the driver in parking the vehicle without making contact with the obstacle.

16. The method of claim 10, wherein detecting the presence of the obstacle comprises recalling drive history data indicating the presence of the obstacle at the vehicle's location.

17. The method of claim 10, further comprising updating a drive history to indicate one or more of a likelihood that a portion of the vehicle will make contact with the obstacle and a required adjustment to a vehicle height such that a portion of the vehicle can drive over the obstacle without making contact with the obstacle.

18. The method of claim 10, wherein determining whether the point on the vehicle is likely to make contact with the obstacle comprises outputting a multi-axis location of the obstacle and a height of the obstacle with reference to a body coordinate system of the vehicle to determine whether the point on the vehicle can travel over the obstacle without making contact with the obstacle.

19. The method of claim 10, further comprising directing an automated driving system in parking the vehicle without making contact with the obstacle or assisting a human driver in parking the vehicle without making contact with the obstacle.

20. The method of claim 10, wherein notifying the driver comprises providing an indication of a multi-axis location of the obstacle and a multi-axis height of the obstacle relative to a vehicle body coordinate system.

* * * * *